(12) United States Patent
Bakken et al.

(10) Patent No.: US 10,054,166 B2
(45) Date of Patent: Aug. 21, 2018

(54) VALVE ACTUATOR ASSEMBLY

(71) Applicant: Honeywell International Inc., Morris Plains, NJ (US)

(72) Inventors: Tom M. Bakken, Apple Vallley, MN (US); Matthew Decker, Minneapolis, MN (US)

(73) Assignee: Honeywell International Inc, Morris Plains, NJ (US)

( * ) Notice: Subject to any disclaimer, the term of this patent is extended or adjusted under 35 U.S.C. 154(b) by 0 days.

(21) Appl. No.: 15/436,571

(22) Filed: Feb. 17, 2017

(65) Prior Publication Data

US 2017/0241560 A1 Aug. 24, 2017

Related U.S. Application Data

(60) Provisional application No. 62/297,722, filed on Feb. 19, 2016.

(51) Int. Cl.
*F16K 31/04* (2006.01)
*B23P 19/00* (2006.01)
(Continued)

(52) U.S. Cl.
CPC .............. *F16D 1/02* (2013.01); *F16D 1/087* (2013.01); *F16D 1/10* (2013.01); *F16D 1/101* (2013.01);
(Continued)

(58) Field of Classification Search
CPC ................. F16K 31/041; F16K 31/055; Y10T 137/6031; F16D 1/02; F16D 1/087; F16D 1/10; F16D 1/101; F24F 13/00
See application file for complete search history.

(56) References Cited

U.S. PATENT DOCUMENTS 9,123 A 7/1852 Turner
14,795 A 5/1856 Buss
(Continued)

FOREIGN PATENT DOCUMENTS

EP 0612950 A1 8/1994
EP 1235128 A2 8/2002
(Continued)

OTHER PUBLICATIONS

"Smart-T and MT-Adapt—HW Mounting Adapter," 1 page, prior to Feb. 23, 2011.
(Continued)

*Primary Examiner* — Craig Schneider
*Assistant Examiner* — Kevin Barss
(74) *Attorney, Agent, or Firm* — Seager Tufle & Wickhem LLP

(57) ABSTRACT

A valve actuator assembly that include an actuator and an actuator mounting assembly. The actuator mounting assembly may be secured to a valve shaft without the actuator present, and the actuator may be secured to the actuator mounting assembly later. This can make it easier to mount the actuator mounting assembly, especially in cramped spaces. In some cases, the actuator may be wired where it is convenient, and then moved to the actuator mounting assembly and secured to the mounted actuator mounting assembly, sometimes with a simple snap attachment. In some cases, a button, lever or other mechanism may release the actuator from the actuator mounting assembly for easy removal.

20 Claims, 18 Drawing Sheets

(51) Int. Cl.
  *F16D 1/02*   (2006.01)
  *F16D 1/08*   (2006.01)
  *F24F 13/00*  (2006.01)
  *F16K 31/05*  (2006.01)
  *F16D 1/10*   (2006.01)

(52) U.S. Cl.
  CPC .......... *F16K 31/041* (2013.01); *F16K 31/055* (2013.01); *F24F 13/00* (2013.01); *F16D 2001/103* (2013.01)

(56) References Cited

U.S. PATENT DOCUMENTS

| | | |
|---|---|---|
| 214,538 A | 4/1879 | Westermaier |
| 1,414,354 A | 5/1922 | Gibbs |
| 1,879,099 A | 9/1932 | Coffey |
| 1,969,827 A | 8/1934 | Tautz |
| 2,428,688 A | 10/1947 | Stischer |
| 2,616,452 A | 11/1952 | Clay et al. |
| 3,117,257 A | 1/1964 | Stone |
| 3,262,027 A | 7/1966 | Zaleske et al. |
| 3,295,079 A | 12/1966 | Brown |
| 3,595,505 A | 7/1971 | Burwell |
| 3,625,503 A | 12/1971 | Hall |
| 3,727,160 A | 4/1973 | Churchill |
| 3,776,275 A | 12/1973 | Updike |
| 3,849,008 A | 11/1974 | Boucher et al. |
| 3,880,534 A | 4/1975 | Schmidt |
| 4,276,692 A | 7/1981 | Casler et al. |
| 4,327,608 A | 5/1982 | Keys |
| 4,354,399 A | 10/1982 | Katayama |
| 4,433,218 A | 2/1984 | Provencher |
| 4,487,634 A | 12/1984 | Turbak et al. |
| 4,490,081 A | 12/1984 | Kuchuk-Yatsenko et al. |
| 4,527,440 A | 7/1985 | Heitman et al. |
| 4,549,446 A | 10/1985 | Beeson |
| D286,907 S | 11/1986 | Strebe |
| 4,671,540 A | 6/1987 | Medvick et al. |
| 4,683,453 A | 7/1987 | Vollmer et al. |
| D295,280 S | 4/1988 | Walser |
| 4,805,870 A | 2/1989 | Mertz |
| 4,810,213 A | 3/1989 | Chabot |
| 4,836,497 A | 6/1989 | Beeson |
| 4,887,634 A | 12/1989 | Killian |
| 5,026,197 A | 6/1991 | Johnson et al. |
| 5,118,078 A | 6/1992 | Younker |
| 5,133,265 A | 7/1992 | Lahti et al. |
| 5,187,916 A | 2/1993 | Errani et al. |
| 5,223,679 A | 6/1993 | Yoo |
| 5,236,006 A | 8/1993 | Platusich et al. |
| 5,241,292 A | 8/1993 | Bjorknas et al. |
| 5,326,006 A | 7/1994 | Giard, Jr. |
| 5,509,752 A | 4/1996 | Kocisek |
| 5,518,462 A | 5/1996 | Yach |
| 5,540,414 A | 7/1996 | Giordani et al. |
| 5,544,970 A | 8/1996 | Studer |
| 5,551,477 A | 9/1996 | Kanno et al. |
| 5,564,461 A | 10/1996 | Raymond, Jr. et al. |
| 5,581,222 A | 12/1996 | Pinaud |
| 5,634,486 A | 6/1997 | Hatting et al. |
| 5,638,927 A | 6/1997 | Cheatham et al. |
| 5,651,631 A | 7/1997 | Carmien |
| 5,765,466 A | 6/1998 | Plantan et al. |
| 5,806,555 A | 9/1998 | Magno, Jr. |
| 5,808,534 A | 9/1998 | Laffey |
| 5,887,608 A | 3/1999 | Bordelon et al. |
| 5,896,959 A | 4/1999 | Jeffries et al. |
| 5,911,595 A | 6/1999 | Orr, Jr. et al. |
| 5,954,088 A | 9/1999 | Huang |
| 5,971,378 A | 10/1999 | Sweeney |
| 6,073,907 A | 6/2000 | Schreiner, Jr. et al. |
| 6,079,704 A | 6/2000 | Buck |
| 6,322,282 B1 | 11/2001 | Kussman et al. |
| 6,422,258 B1 | 7/2002 | DuHack et al. |
| 6,505,991 B2 | 1/2003 | Roman |
| D480,450 S | 10/2003 | Saadi et al. |
| 6,644,999 B1 | 11/2003 | Tan et al. |
| 6,655,919 B2 | 12/2003 | Rossi et al. |
| 6,684,901 B1 | 2/2004 | Cahill et al. |
| 6,742,765 B2 | 6/2004 | Takano et al. |
| 6,789,781 B2 | 9/2004 | Johnson et al. |
| D498,821 S | 11/2004 | Nortier |
| 6,837,646 B1 | 1/2005 | Minger |
| 6,848,672 B2 | 2/2005 | Cross et al. |
| 6,880,806 B2 | 4/2005 | Haikawa et al. |
| 6,932,319 B2 | 8/2005 | Kowalski |
| 6,935,615 B2 | 8/2005 | McCarty |
| 6,994,320 B2 | 2/2006 | Johnson et al. |
| 7,025,328 B2 | 4/2006 | Ulicny et al. |
| 7,048,251 B2 | 5/2006 | Schreiner |
| 7,074,087 B2 | 7/2006 | Szczesny et al. |
| 7,128,192 B2 | 10/2006 | Fox |
| 7,131,635 B2 | 11/2006 | Oh |
| 7,186,133 B1 | 3/2007 | Szczesny |
| 7,188,481 B2 | 3/2007 | DeYoe et al. |
| D543,003 S | 5/2007 | Helmetsie |
| 7,234,963 B1 | 6/2007 | Huang |
| D571,290 S | 6/2008 | Gebhart et al. |
| 7,395,718 B2 | 7/2008 | Obermeier |
| D587,211 S | 2/2009 | Greenslade |
| 7,494,376 B1 | 2/2009 | Foltz |
| 7,507,108 B2 | 3/2009 | Tsuji |
| D610,655 S | 2/2010 | Schmidt |
| D614,150 S | 4/2010 | Crites |
| 7,704,008 B2 | 4/2010 | Shinozaki et al. |
| 7,708,254 B2 | 5/2010 | Hertzog |
| 7,798,170 B2 | 9/2010 | Hotz |
| D629,871 S | 12/2010 | Marinoni et al. |
| 7,871,288 B1 | 1/2011 | Lee |
| D650,337 S | 12/2011 | Bonomi |
| D654,523 S | 2/2012 | Iranyi et al. |
| 8,287,207 B2 | 10/2012 | Bakken et al. |
| D697,585 S | 1/2014 | Liu et al. |
| 8,632,054 B2 | 1/2014 | Carlson et al. |
| 8,733,735 B2 | 5/2014 | Strebe |
| 8,789,807 B2 | 7/2014 | Kreuter |
| 8,887,655 B2 | 11/2014 | Carlson et al. |
| 8,935,849 B2 | 1/2015 | Gross et al. |
| 8,968,023 B1 | 3/2015 | Walters et al. |
| 9,016,662 B2 | 4/2015 | Staffiere et al. |
| 9,423,818 B2 | 8/2016 | Gibbons, Jr. et al. |
| 2003/0213662 A1 | 11/2003 | Fox |
| 2004/0089835 A1 | 5/2004 | Schreiner |
| 2004/0099833 A1 | 5/2004 | Haikawa et al. |
| 2004/0173770 A1 | 9/2004 | Kowalski |
| 2004/0216912 A1 | 11/2004 | Osborn, Jr. |
| 2006/0131532 A1 | 6/2006 | Oh |
| 2006/0204322 A1 | 9/2006 | Roiser |
| 2007/0176068 A1 | 8/2007 | Kuo-Chen |
| 2011/0240893 A1 | 10/2011 | Windgassen |
| 2012/0199776 A1 | 8/2012 | Kreuter |
| 2012/0211688 A1 | 8/2012 | Carlson et al. |
| 2014/0224353 A1 | 8/2014 | Strebe |

FOREIGN PATENT DOCUMENTS

| | | |
|---|---|---|
| EP | 1672261 A1 | 6/2006 |
| EP | 1967777 B1 | 10/2009 |
| WO | 02077478 A1 | 10/2002 |
| WO | 2006121905 A2 | 11/2006 |
| WO | 2011066328 A1 | 6/2011 |
| WO | 2015108910 A1 | 7/2015 |

OTHER PUBLICATIONS

Search Report for EP Application No. 12156608.7-2422 dated Jun. 1, 2012.

Honeywell, "MT-Clip—Mounting Clips for MT4/MT8," 1 page, prior to Feb. 23, 2011.

Honeywell, "MT-Clip—ATP Mounting Clips for MT4MT8," 2 pages, 2006.

Honeywell, "MT4-024MT4-230 MT8-024/MT8-230 Small Linear Thermoelectric Actuators," Product Data, 5 pages, 2009.

(56) References Cited

OTHER PUBLICATIONS

Honeywell, "Small Linear Thermostat Actuator, MT4-024/MT4-230/MT8-024/M18230," Mounting Instructions, 2 pages, 2006.
Honeywell, "VC6800, VC6900 Series Floating Control Valves," Product Data, 6 pages, Nov. 1996.
Honeywell, "Dampers Actuators and Valves," Application and Selection Guide, 295 pages, Jan. 2011.
Honeywell, "Excel 10 W7751H3007 VAV Actuators," Installation Instructions, 10 pages, 2007.
Honeywell, "M5410 C1001/L1001 Small On/Off Linear Valve Actuators," Product Data, 4 pages, 2010.
Honeywell, "M6061 Rotary Valve Actuators," Product Data, 6 pages, 2011.
Honeywell, "M7061 Installation Instructions," 2 pages, 2003.
Honeywell, "ML6420A30xx/ML7420A60xx," Electric Linear Valve Actuators, Installation Instructions, 2 pages, 2010.
Honeywell, "ML6435B/ML7435E Electric Linear Actuators for Floating/Modulating Control," Installation Instructions, 2 pages, 2008.
Honeywell, "N20010, N34010 Non-Spring Return Damper Actuator 20/34 Nm (177/300 lb-in) for Modulating Control, Product Data," 7 pages, 2013.
Honeywell, "N20xx/N34xx Non-spring Return Direct-Coupled Damper Actuators," Wiring, 4 pages, 2012.
Honeywell, "Small Linear Thermoelectric Actuator, MT4-024/MT4-230/MT8-024/MT8-230," Mounting Instructions, 2 pages, 2007.
Honeywell, "VC2, VC4, VC60, VC8 On-Off Actuator for VC Series Balanced Hydronic Valves," Installation Instructions, 8 pages, 2011.
Honeywell, M5003A, 2 pages, Sep. 2010.
Honeywell, M6410C/L M7410C, 2 pages, prior to Feb. 23, 2011.

VALVE ACTUATOR ASSEMBLY

This application claims priority from U.S. Provisional Application No. 62/297,722, filed Feb. 19, 2016, and entitled "VALVE ACTUATOR ASSEMBLY, which is incorporated herein by reference.

TECHNICAL FIELD

The present disclosure pertains generally to valve actuator assemblies.

BACKGROUND

A variety of systems today include valves, and more particularly, actuatable valves. For example, many industrial processes include actuatable valves to help control the flow of fluids (liquid and/or gas) in a manufacturing process. In another example, many HVAC systems include actuatable valves such as air dampers, water valves, gas valves, ventilation flaps, louvers, and/or other actuatable valves that help regulate or control the flow of fluid in the HVAC system.

Many such systems include components located within tight spaces, such as behind industrial process equipment, within walls, crawl spaces, or attic spaces of a structure. These areas are often poorly illuminated and/or cramped, leaving little room for installation and/or maintenance. Access for tools or even a second hand can often be difficult and problematic. Once a valve actuator is installed and attached to a valve shaft, the wiring of the valve actuator can be difficult and time consuming due to the space constraints. If there were errors in the installation of the valve actuator (e.g., clock-wise rotation versus counter-clockwise rotation of the valve), complete removal of the valve actuator and re-installation are often required.

A need remains for improved devices that promote easier installation and/or maintenance of actuatable valves in the field, especially in cramped and/or poorly illuminated areas.

SUMMARY

The present disclosure pertains generally to valve actuator assemblies, and more particularly, to valve actuator assemblies that include an actuator and an actuator mounting assembly. The actuator mounting assembly may be secured to a valve shaft without the actuator present, and the actuator may be secured to the actuator mounting assembly later. This can make it easier to mount the actuator mounting assembly, especially in cramped spaces. In some cases, the actuator may be wired where it is convenient, and then moved to the actuator mounting assembly and secured to the mounted actuator mounting assembly, sometimes with a simple snap attachment. In some cases, a button, lever or other mechanism may release the actuator from the actuator mounting assembly for easy removal.

In some cases, the actuator and actuator mounting assembly may be configured so that the actuator may be mountable to the actuator mounting assembly in two different orientations. In one orientation, the actuator may rotate the valve shaft via the actuator mounting assembly in a clock-wise direction, and in the other orientation, the actuator may rotate the valve shaft in a counter-clock-wise direction. When so provided, the drive direction of the valve shaft can be changed by simply pushing a release button, lever or other mechanism to release the actuator from the actuator mounting assembly, re-orientate the actuator, and then re-attached the actuator to the actuator mounting assembly. This can typically be easily accomplished even in cramped spaces.

The present disclosure may be applied to any suitable actuatable valve assembly. For example, the present disclosure may be applied to any suitable HVAC actuatable valve assembly such as HVAC damper actuators used to actuate air dampers within air ducts, HVAC valve actuators used to actuate water valves within hydronic heating and/or cooling systems, and/or any other fluid or gas valves as desired. The above summary is not intended to describe each disclosed embodiment or every implementation of the disclosure. The Description which follows more particularly exemplifies these embodiments.

BRIEF DESCRIPTION OF THE FIGURES

The following description should be read with reference to the drawings. The drawings, which are not necessarily to scale, depict selected embodiments and are not intended to limit the scope of the disclosure. The disclosure may be more completely understood in consideration of the following detailed description of various embodiments in connection with the accompanying drawings, in which.

Figure 1:
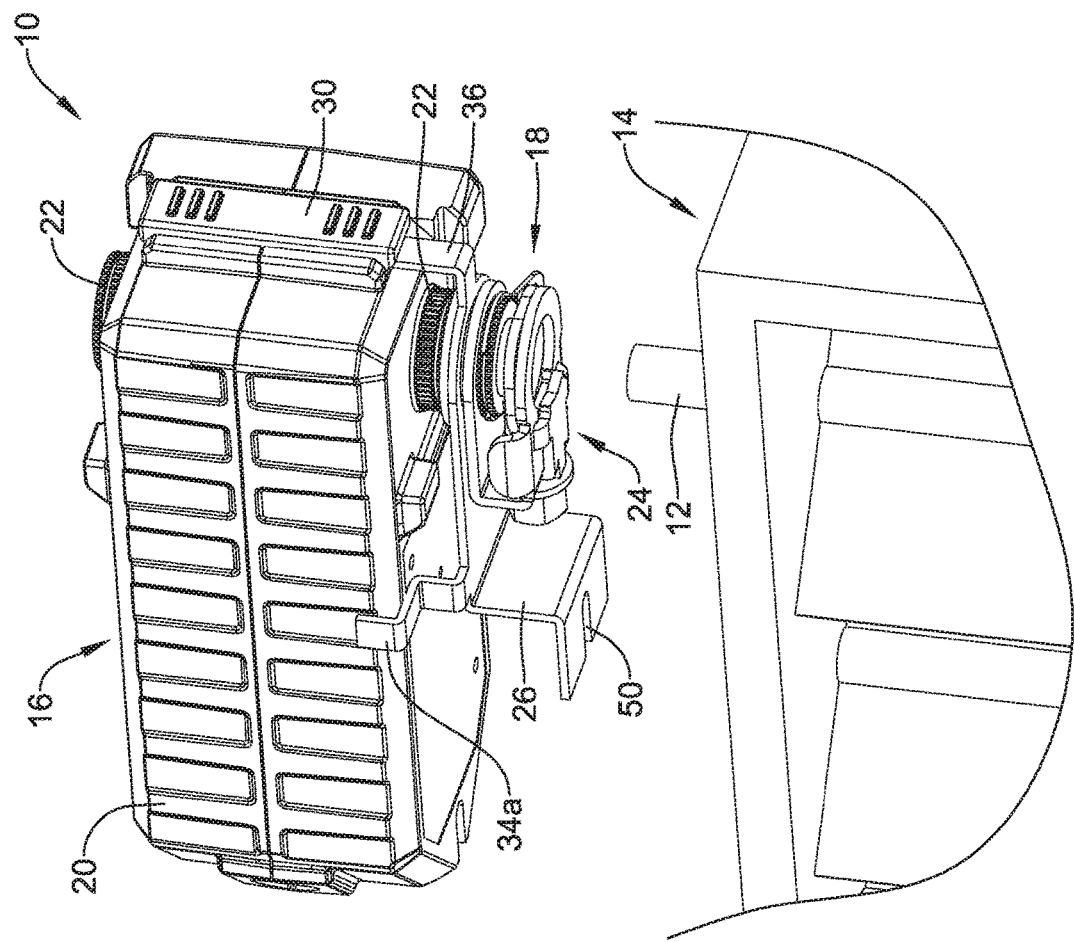
FIG. 1 is a perspective view of an illustrative but non-limiting valve actuator for driving an air damper.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict selected embodiments and are not intended to limit the scope of the disclosure. Although examples of construction, dimensions, and materials are illustrated for the various elements, those skilled in the art will recognize that many of the examples provided have suitable alternatives that may be utilized.

FIG. 1 is a perspective view of an illustrative but non-limiting valve actuator 10 for driving a valve shaft, such as a shaft 12 of an HVAC air damper 14. While FIG. 1 shows the valve actuator 10 driving a shaft 12 of an HVAC air damper 14, it is contemplated that the valve actuator may be used to drive any suitable valve shaft including but not limited to water valves within hydronic heating and/or cooling systems, other fluid or gas valves, and/or any other actuatable valve as desired. The term "valve" may encompass any actuatable valve such as air dampers, water valves, gas valves, ventilation flaps, louvers, and/or other actuatable valves that help regulate or control the flow of fluid in the HVAC system. More generally, it is contemplated that the actuator mounting assemblies disclosed herein may be used for mounting an actuator to drive any suitable rotating shaft, such as a rotating shaft of an HVAC or other component.

The illustrative valve actuator 10 includes an actuator 16 and an actuator mounting assembly 18. The actuator 16 includes a housing 20 that contains an electric motor (not shown) for rotating a drive member 22. In the example shown, the drive member 22 is a tubular structure that extends through the housing 20 and extends out of both the top and bottom sides of the housing as shown. Each end of the drive member 22 may have splines, grooves, teeth or other features that allow a shaft adapter 24 of the actuator mounting assembly 18 to engage the drive member 22 and transfer rotational movement from the drive member 22 to the valve shaft 12.

In the example shown, the actuator mounting assembly 18 combines a shaft adapter 24 and an anti-rotation bracket 26. The shaft adapter 24 may be a self-centering shaft adapter or a non-self-centering shaft adapter. The shaft adapter 24 shown in FIG. 1 is a non-self-centering shaft adapter. With a non-self-centering shaft adapter, the shaft adapter 24 and anti-rotation bracket 26 may oscillate back and forth in a direction that is orthogonal to the axis of the shaft 12 as the shaft 12 is rotated by the actuator 16 by virtue of being off-center from the rotation axis of the shaft 12. In contrast, a self-centering shaft adapter (e.g. see FIGS. 17-18) would automatically center the shaft adapter with respect to the valve shaft as the shaft adapter is secured to the valve shaft. With a self-centering shaft adapter, the shaft adapter and anti-rotation bracket may remain relatively stationary relative to the valve shaft as the valve shaft is rotated by the actuator.

In some cases, the actuator mounting assembly 18 may be secured to the valve shaft 12 without the actuator 16 present. This can make it easier to mount the actuator mounting assembly 18, especially in cramped spaces. In some cases, the actuator 16 may be wired where it is convenient, and then moved to the actuator mounting assembly 18 and secured to the mounted actuator mounting assembly 18, sometimes with a simple snap attachment. In some cases, a button, lever or other mechanism 30 may release the actuator 16 from the actuator mounting assembly 18 for easy hand removal without the need for any tools. In some cases, a tool may be required to release the actuator from the actuator mounting assembly 18.

In some cases the actuator 16 and actuator mounting assembly 18 are configured so that the actuator 16 may be mountable to the actuator mounting assembly 18 in two different orientations. In one orientation, the actuator 16 may rotate the valve shaft 12 via the actuator mounting assembly 18 in a clock-wise direction, and in the other orientation, the actuator 16 may rotate the valve shaft 12 in a counter-clockwise direction. In the example shown in FIG. 1, the drive member 22 extends out of both the top and bottom sides of the housing 20, and each end of the drive member 22 may have splines, grooves, teeth or other features. This may allow the shaft adapter 24 of the actuator mounting assembly 18 to engage the drive member 22 in each of two orientations of the actuator 16. The drive direction of the valve shaft 12 can be changed by simply pushing the button, lever or other mechanism 30 to release the actuator 16 from the actuator mounting assembly 18, re-orientate the actuator 16 (e.g., flipping the actuator 16 over), and then re-attaching the actuator 16 to the actuator mounting assembly 18. This can typically be easily accomplished even in cramped spaces.

Figure 2:
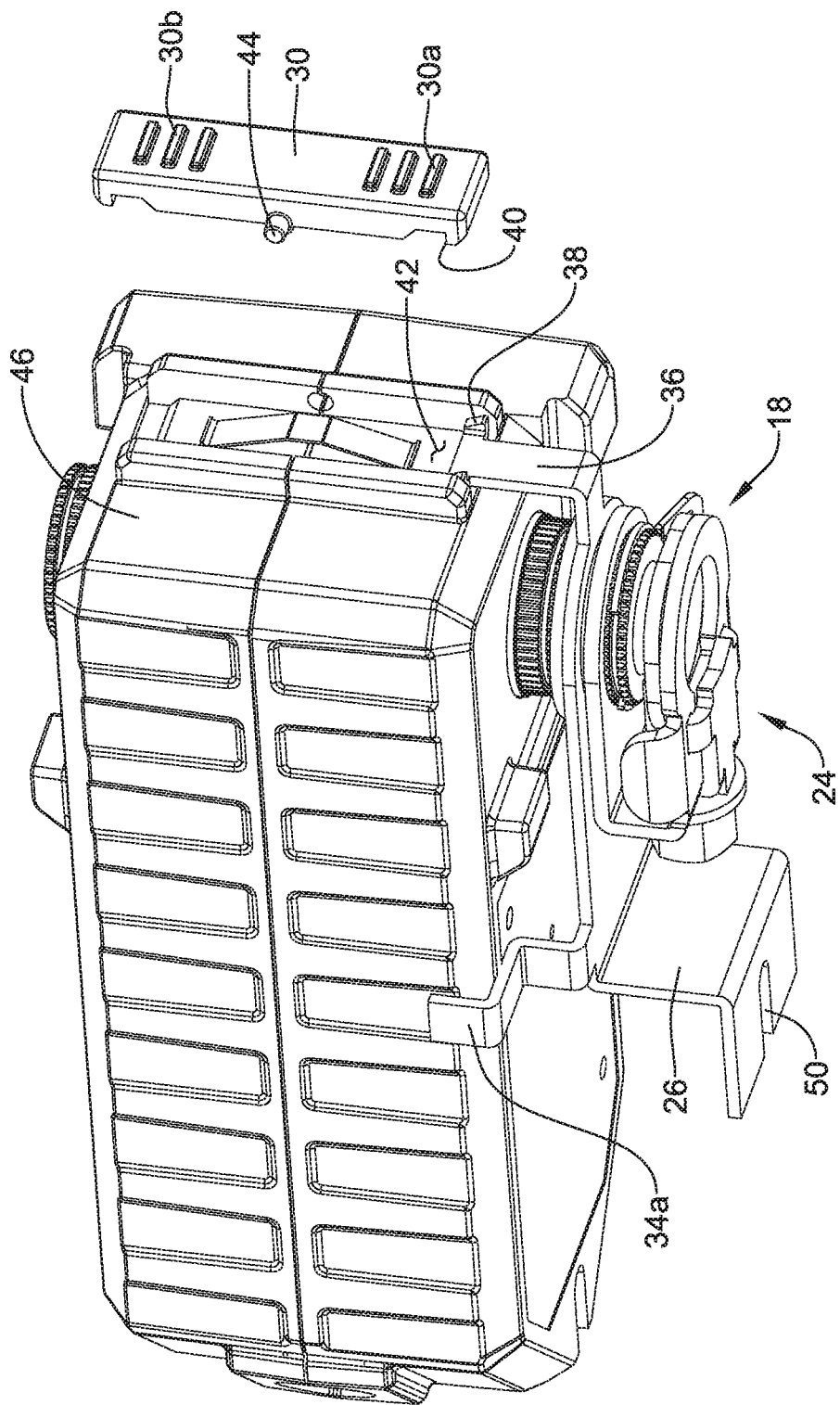
FIG. 2 is a perspective view of the illustrative valve actuator of FIG. 1, with the actuator release lever removed.

FIG. 2 is a perspective view of the illustrative valve actuator of FIG. 1, with the actuator release lever 30 removed. In the example shown, the anti-rotation bracket 26 includes side arms 34a, 34b (collectively, 34) (see also, for example, FIG. 5) that are configured to receive the housing 20 of the actuator 16. The illustrative anti-rotation bracket 26 also includes a front arm 36 with latching features 38. In some cases, the latching features 38 may be one or more protrusions extending generally orthogonal from the longitudinal axis of the front arm 36. The front arm 36 is configured to extend into a slot 42 in the front side 46 of the housing 20 of the actuator 16. The actuator release lever 30, which in FIG. 1 toggles about pin 44, can be used to capture and release the latching features 38 of the front arm 36 to secure and release the actuator 16 relative to the actuator mounting assembly 18. In other words, the actuator release lever 30 may be pivotably coupled to the housing 20. For example, when the lower end 30a of the actuator release lever 30 is pushed toward the front side 46 of the actuator, a latch 40 of the actuator release lever 30 engage the latching features 38 of the front arm 36 to secure the actuator 16 to the actuator mounting assembly 18. When the upper end 30b of the actuator release lever 30 is pushed toward the front side 46 of the actuator 16, latch 40 of the actuator release lever 30 is released from the latching features 38 of the front arm 36, and the actuator 16 can be removed from the actuator mounting assembly 18.

The illustrative anti-rotation bracket 26 also includes a securement slot 50 that may receive a securement (e.g. screw, rivet, bolt, etc.) to prevent anti-rotation bracket 26 from rotating relative to the shaft 12. With the non-self-centering shaft adapter of FIG. 2, the shaft adapter 24 and anti-rotation bracket 26 may move (e.g. oscillate) so that a securement that extends through the securement slot 50 moves (e.g. oscillates) along the securement as the shaft 12 is rotated by the actuator 16.

Figure 3:
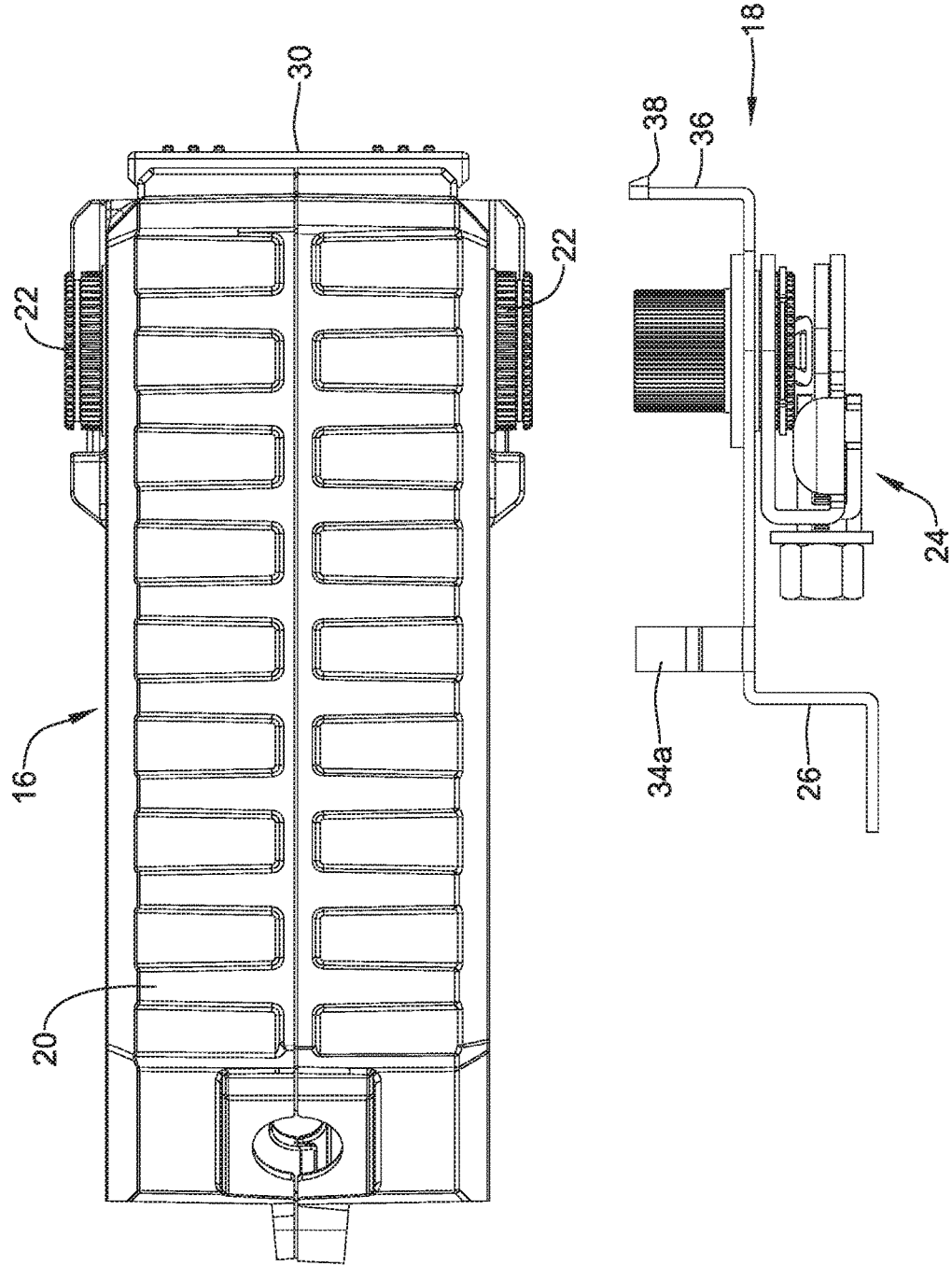
FIG. 3 is a side view of the illustrative valve actuator of FIG. 1, with the actuator mounting assembly separated from the actuator.
Figure 4:
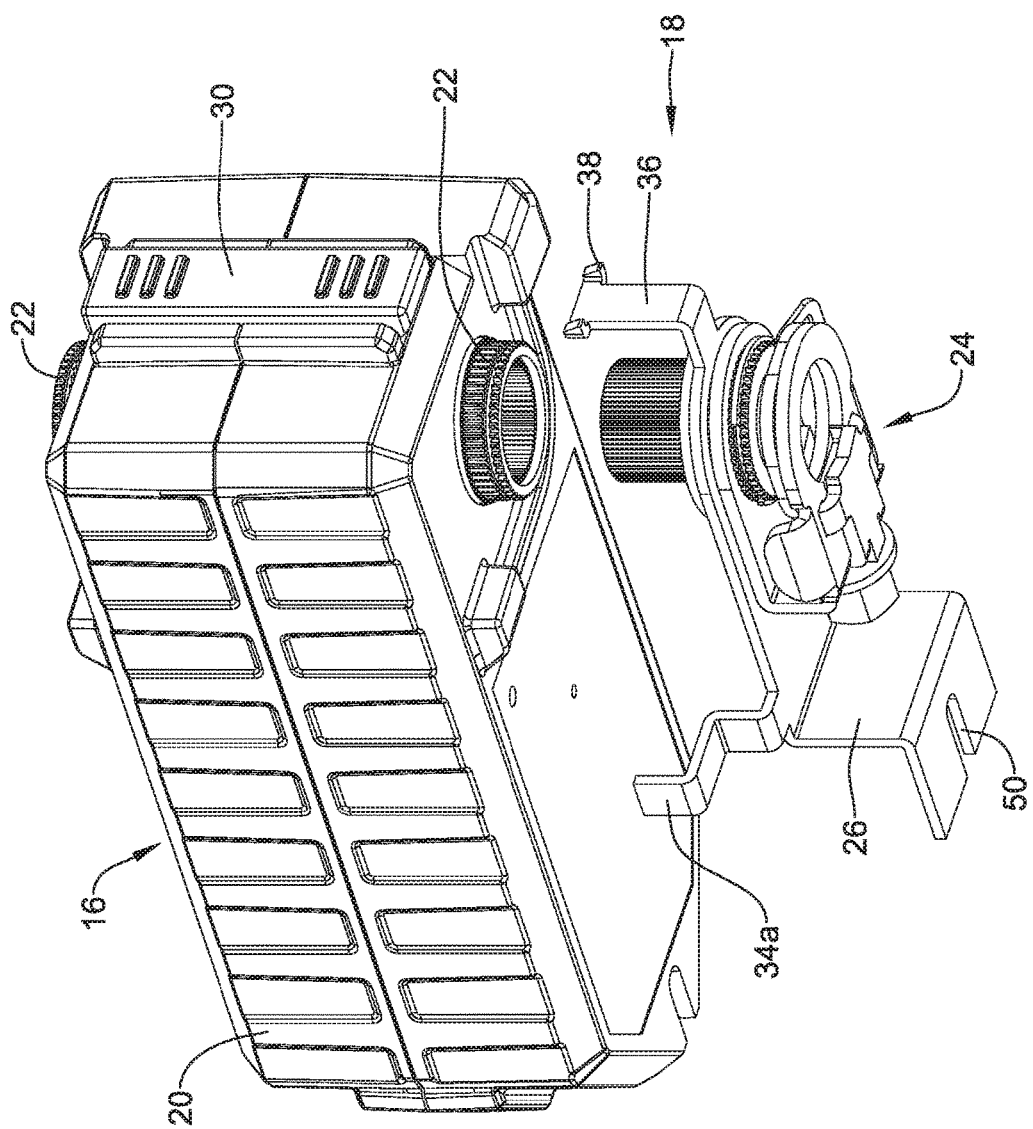
FIG. 4 is a perspective view of the illustrative valve actuator of FIG. 1, with the actuator mounting assembly separated from the actuator.

FIG. 3 is a side view of the illustrative valve actuator of FIG. 1, with the actuator mounting assembly separated from the actuator, and FIG. 4 is a perspective view of the illustrative valve actuator of FIG. 1, with the actuator mounting assembly separated from the actuator.

Figure 5:
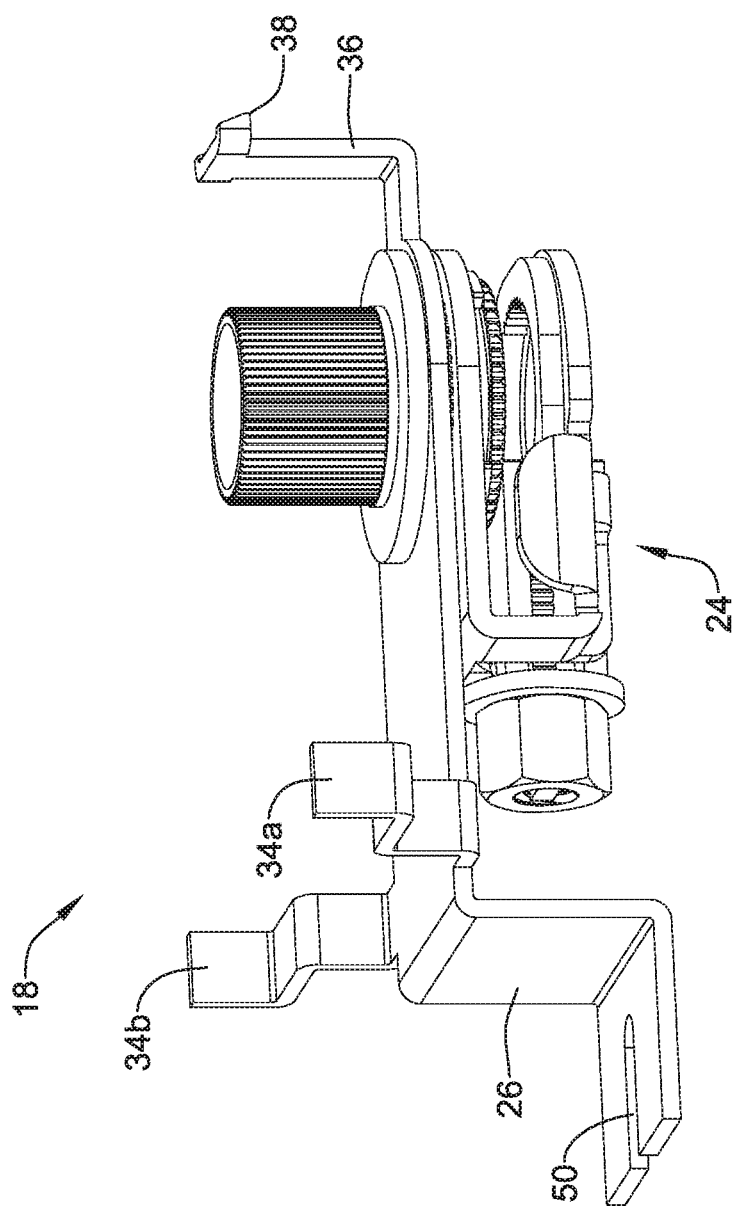
FIG. 5 is a perspective view of the actuator mounting assembly of FIG. 1, which is a non-self-centering actuator mounting assembly.
Figure 6:
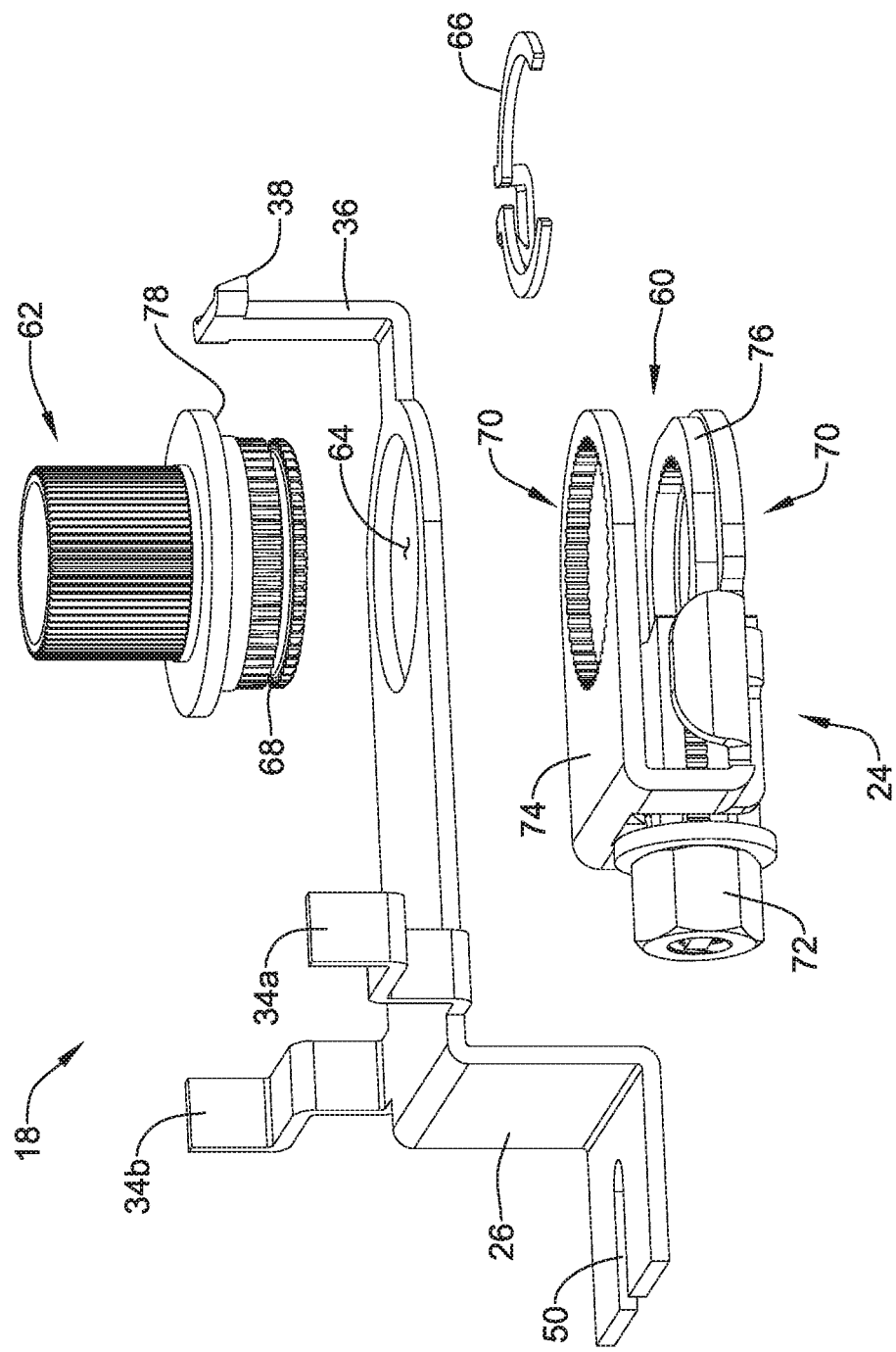
FIG. 6 is a perspective exploded view of the non-self-centering actuator mounting assembly shown in FIG. 5.

FIG. 5 is a perspective view of the actuator mounting assembly 18 of FIG. 1, which is a non-self-centering actuator mounting assembly. The illustrative actuator mounting assembly 18 combines a shaft adapter 24 and an anti-rotation bracket 26. As best seen in FIG. 6, the illustrative shaft adapter 24 includes a shaft coupler assembly 60 and a drive shaft 62. The illustrative shaft coupler assembly 60 is a non-self-centering shaft coupler assembly. During use, after a shaft 12 is inserted through a shaft receiving aperture 70, the installer turns nut 72 in a clockwise direction to pull capture bracket 76 toward the nut until the capture bracket secures the shaft coupler to the valve shaft 12.

The lower end of drive shaft 62 extends through a drive shaft receiving aperture 64 in the anti-rotation bracket 26 until a lip 78 engages the top side of the anti-rotation bracket 26. The capture bracket 74 has splines defining the shaft receiving aperture 70. These splines are configured to engage corresponding splines defined on the outer surface of the lower end of the drive shaft 62, so that the shaft coupler assembly 60 is rotationally fixed relative to the drive shaft 62. The upper end of the drive shaft 62 is configured to extend into the tubular drive member 22. The outside surface of the upper end of the drive shaft 62 has splines that are configured to engage corresponding splines on the inside surface of the tubular drive member 22. In this way, the drive shaft 62 is rotationally fixed relative to the drive member 22 of the actuator 16, and rotational torque generated by the actuator 16 is transmitted to the drive shaft 62 through the drive member 22, which is transmitted to the shaft 12 through the shaft coupler assembly 60.

A groove 68 is positioned in the lower end of the drive shaft 62 below the capture bracket 74 when the lip is positioned on the top side of the anti-rotation bracket 26 and the capture bracket 74 is pressed up against the bottom side of the anti-rotation bracket 26. A clip 66 is inserted into the groove 68 to secure the drive shaft 62 to the capture bracket 74 and thus the shaft coupler assembly 60.

Figure 7:
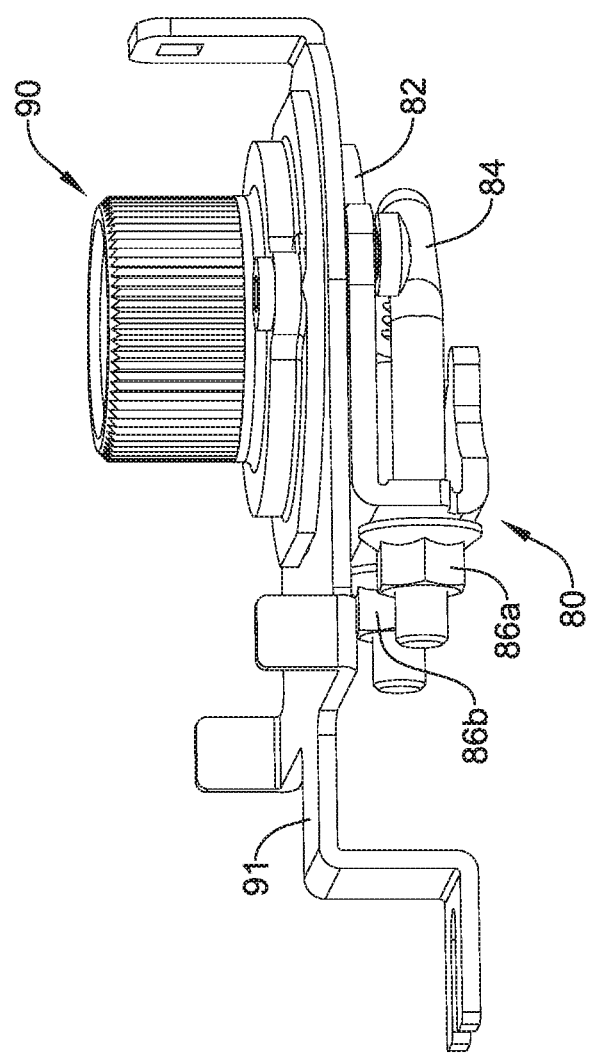
FIG. 7 is a perspective view of the another illustrative non-self-centering actuator mounting assembly.
Figure 8:
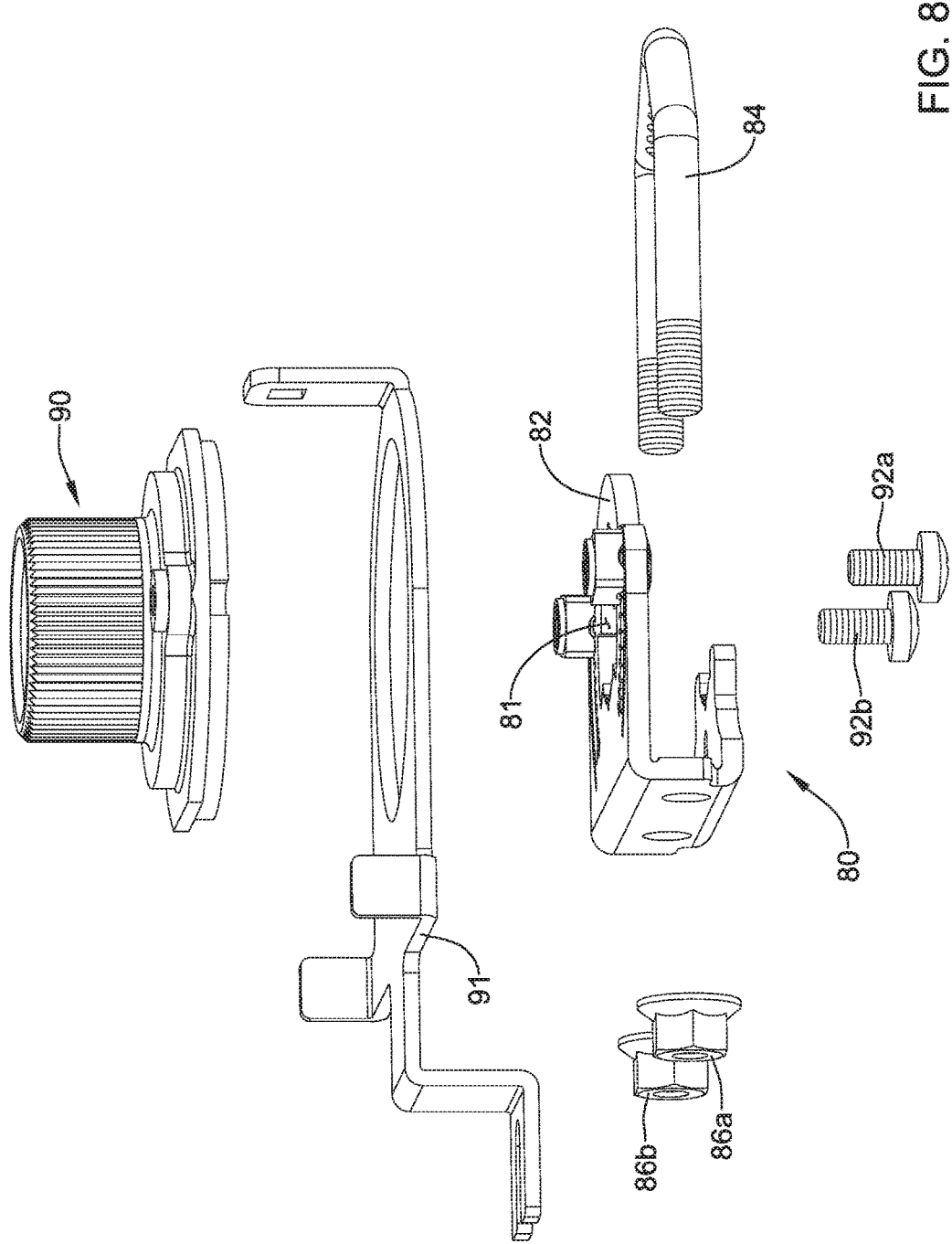
FIG. 8 is a perspective exploded view of the illustrative non-self-centering actuator mounting assembly shown in FIG. 7.

FIG. 7 is a perspective view of the an illustrative non-self-centering actuator mounting assembly, and FIG. 8 is a perspective exploded view of the illustrative non-self-centering actuator mounting assembly shown in FIG. 7. This example is similar in construction to the non-self-centering actuator mounting assembly of FIG. 5. However, in this example, and as best shown in FIG. 8, a shaft coupler assembly 80 is provided that includes a shaft receiving bracket 82, a U-bolt 84 and nuts 86a and 86b. During use, a shaft 12 is inserted through a shaft receiving aperture 81 in the shaft receiving bracket 82. The U-bolt 84 is placed around the shaft 12 and nuts 86a and 86b are tightened to secure the shaft 12 between the U-bolt 84 and the opposing side of the shaft receiving aperture 81. The shaft receiving bracket 82 is secured to drive shaft 90 by screws 92a and 92b (rather than a clip as in FIGS. 5-6). When so provided, the shaft receiving bracket 82 rotates with the drive shaft 90, and both can rotate relative to the anti-rotation bracket 91.

Figure 9:
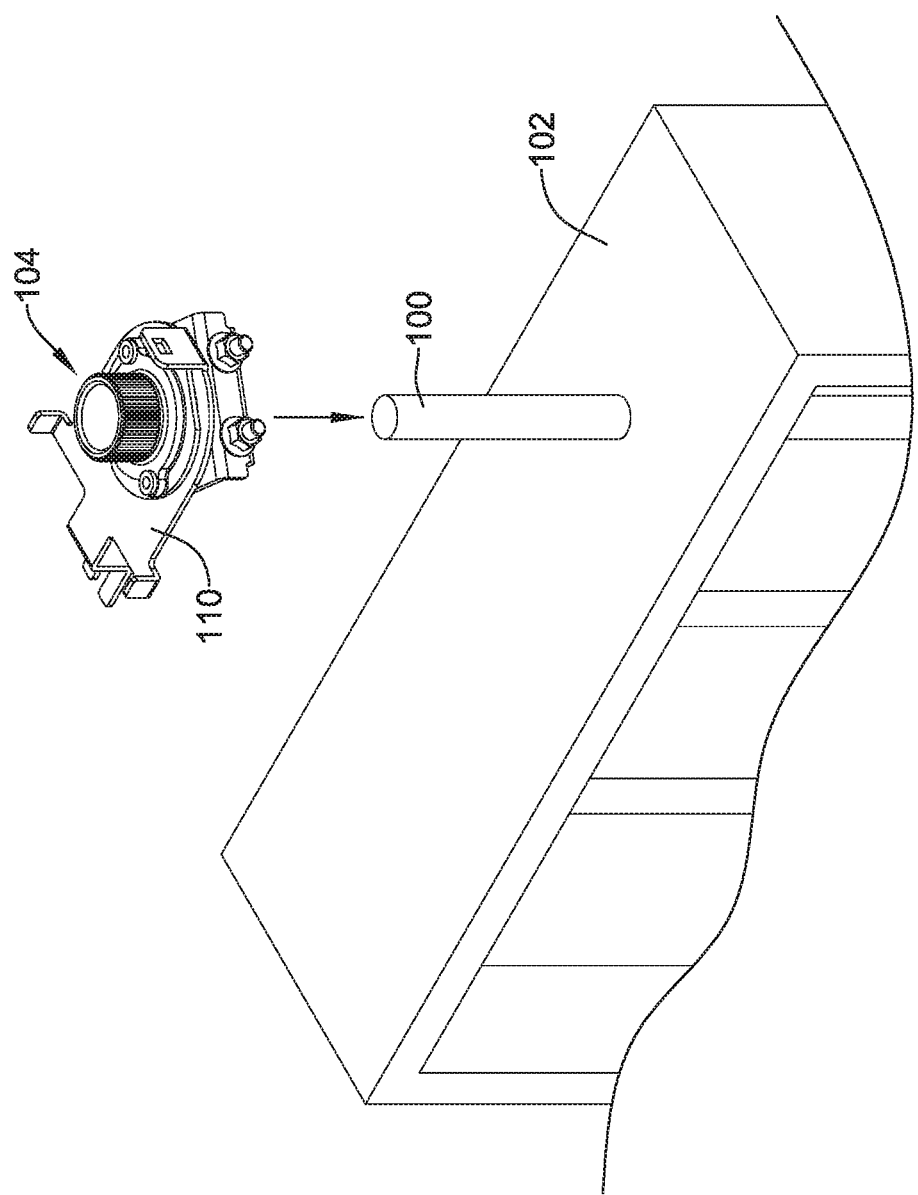
FIGS. 9-16 show an illustrative method for installing an illustrative non-self-centering valve actuator to an HVAC damper shaft.
Figure 10:
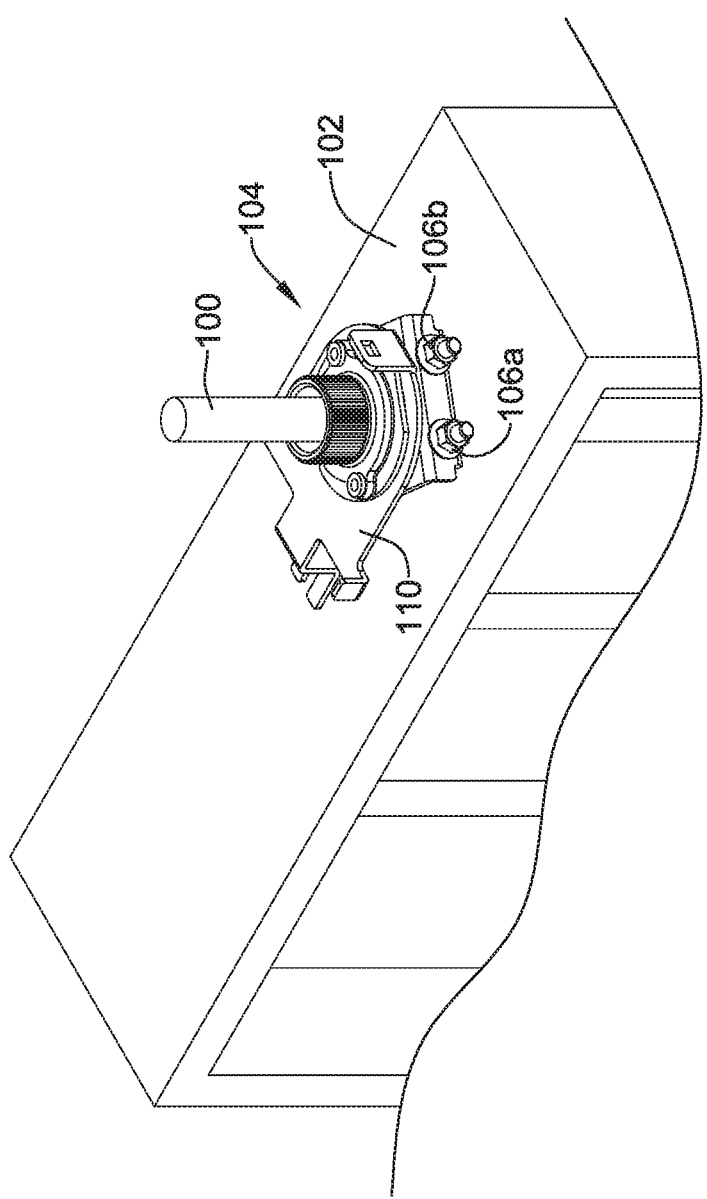
Figure 11:
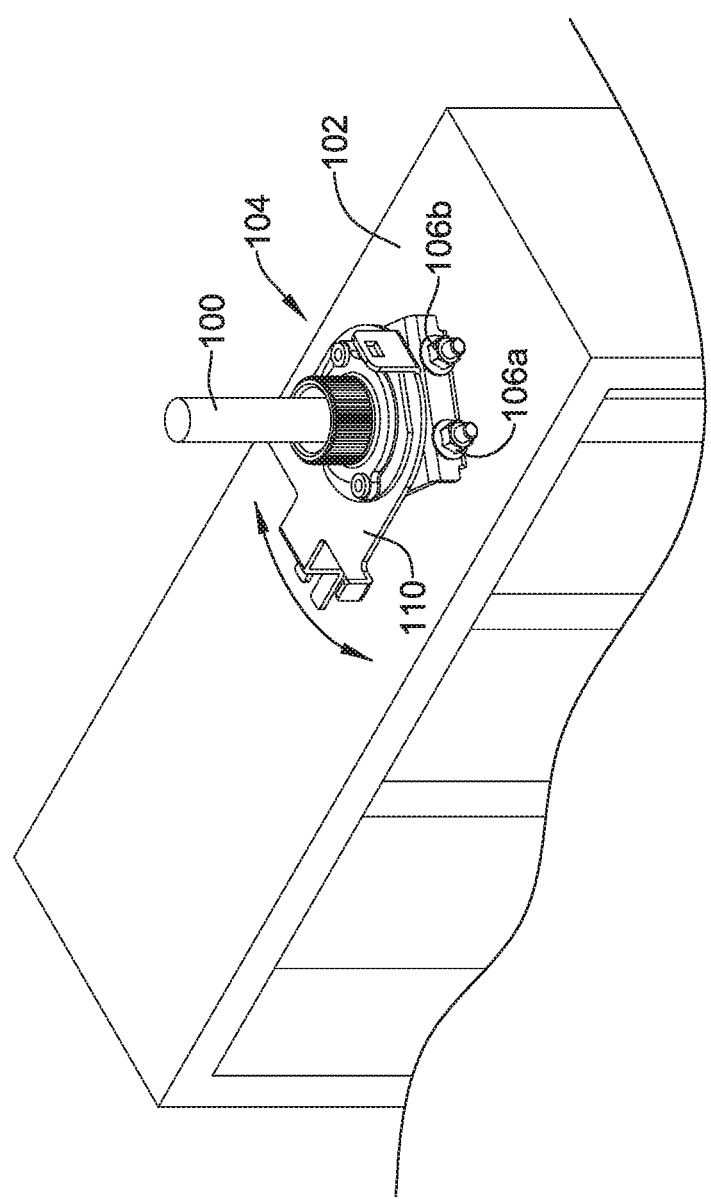
Figure 12:
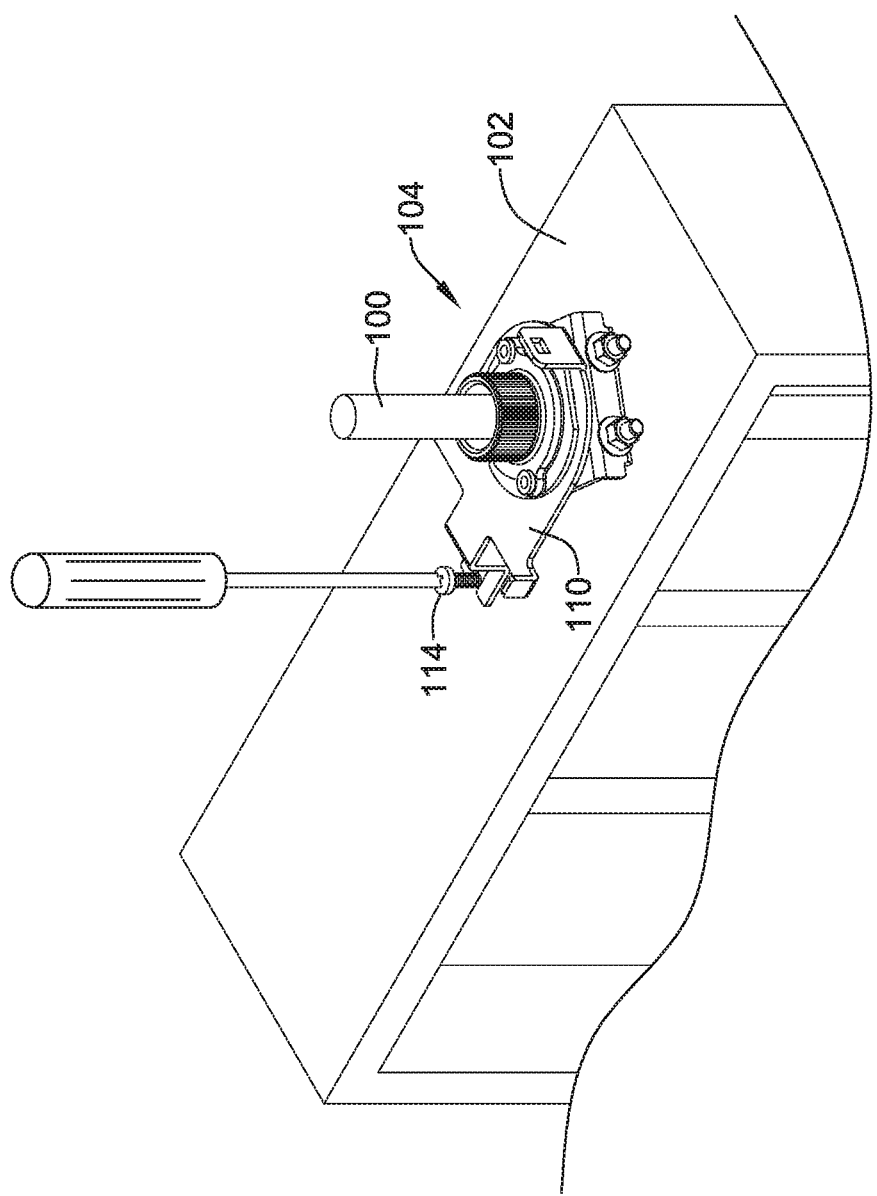
Figure 13:
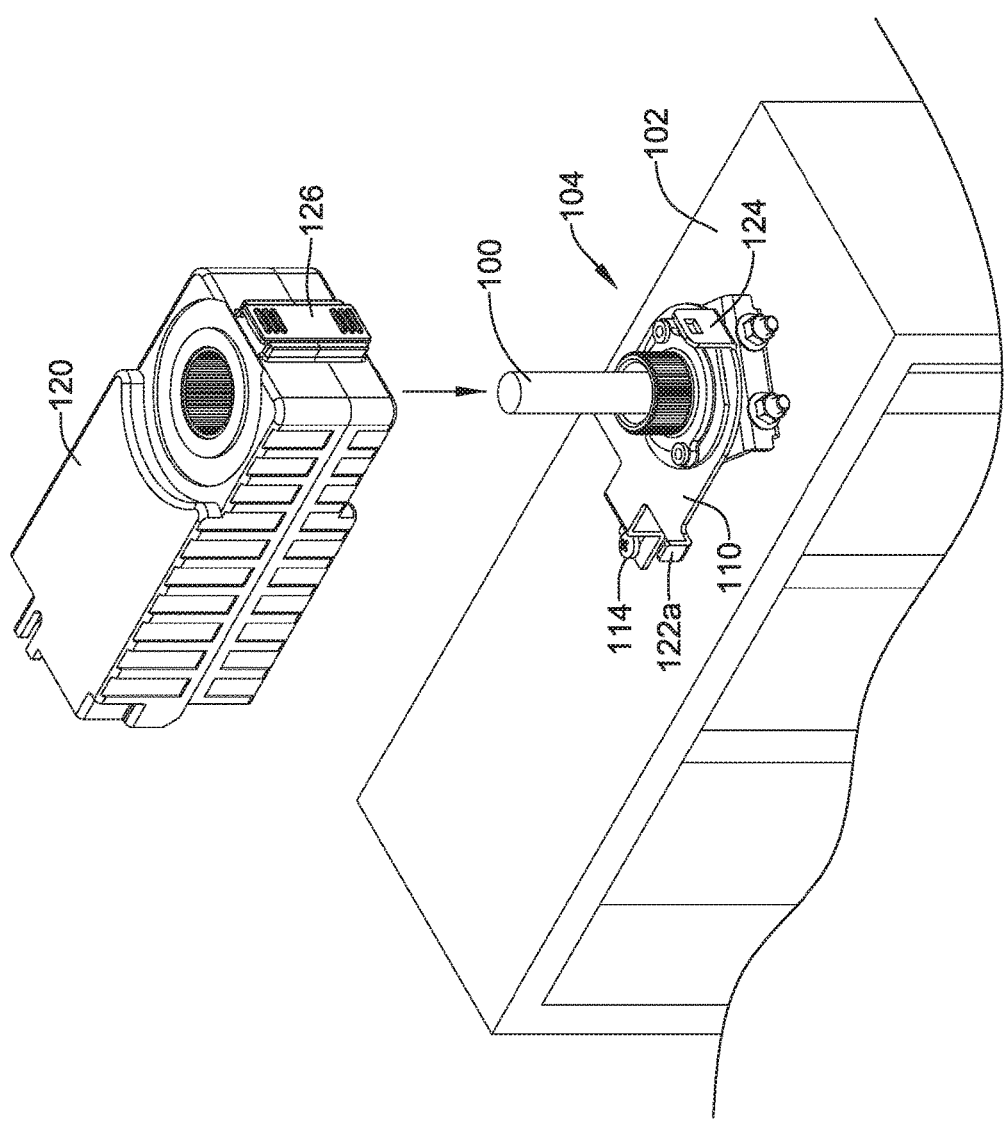
Figure 14:
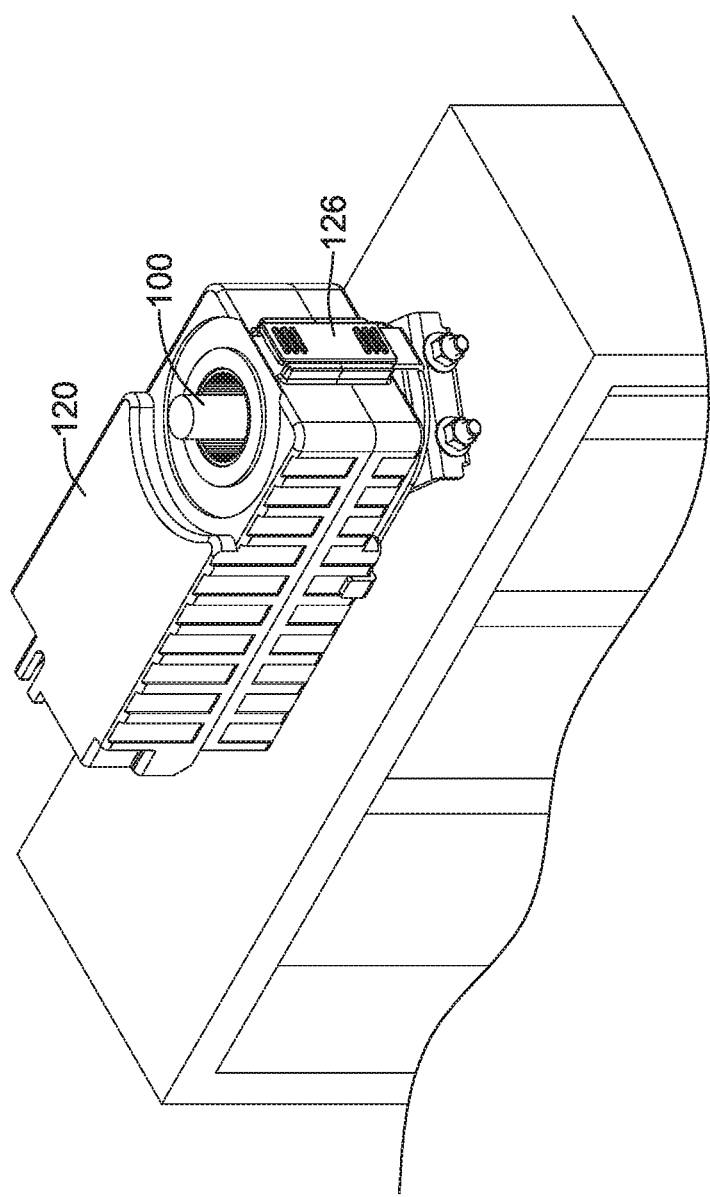

FIGS. 9-16 show an illustrative method for installing a non-self-centering valve actuator to an HVAC damper shaft. In FIG. 9, a non-self-centering actuator mounting assembly 104 similar to that described above with respect to FIGS. 7-8 is placed over a valve shaft 100. In this example, the valve shaft 100 controls a position of a damper in an HVAC duct 102. FIG. 10 shows the non-self-centering actuator mounting assembly 104 placed over the shaft 100. Nuts 106a and 106b are then tightened to secure the non-self-centering actuator mounting assembly 104 to the shaft 100. In FIG. 11, the anti-rotation plate 110 of the non-self-centering actuator mounting assembly 104 can be rotated to a desired position. In FIG. 12, a securement 114 (e.g. screw) is used to prevent the anti-rotation plate 110 from rotating. The securement 114 may not be tightened down to allow the anti-rotation plate 110 to move (e.g. oscillate) along the securement receiving slot in the anti-rotation plate 110 as the shaft 100 rotates with the actuator 120. Next, as shown in FIG. 13, an actuator 120 is placed onto the non-self-centering actuator mounting assembly 104. The actuator 120 is received by two opposing side arms (side arm 122a and another side arm that is behind the shaft 100 in FIG. 13) and snap fits with front arm 124. FIG. 14 shows the non-self-centering valve actuator coupled to the damper shaft 100.

Figure 15:
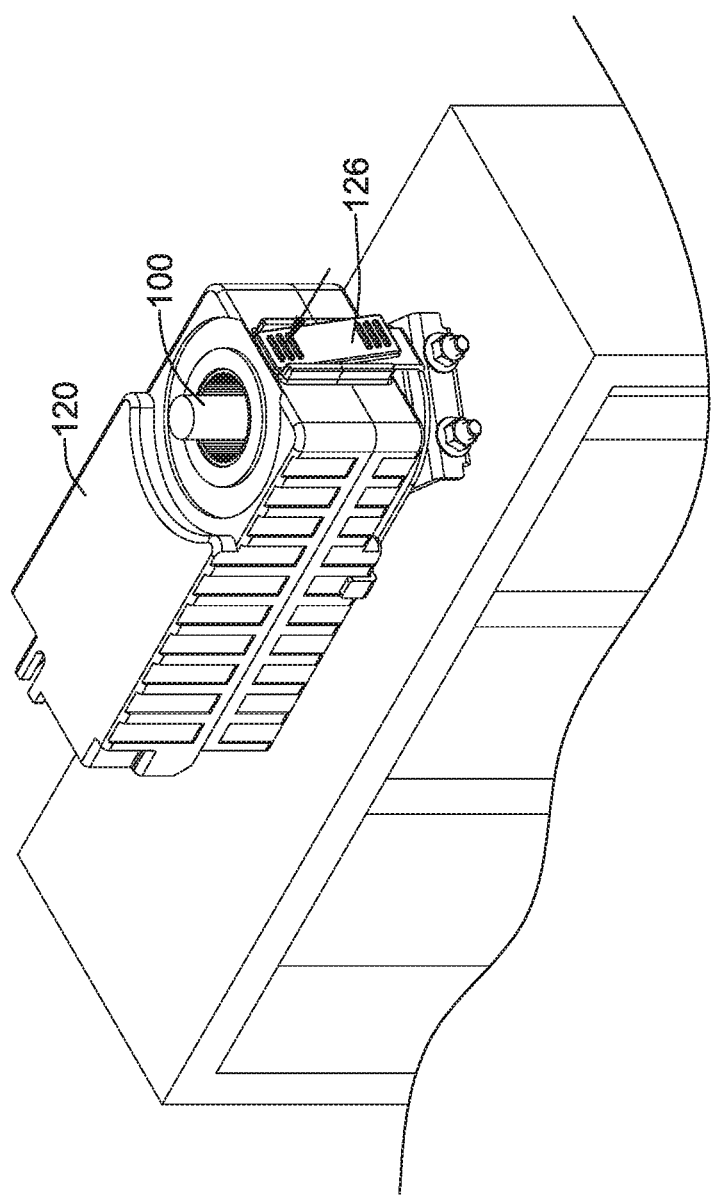
Figure 16:
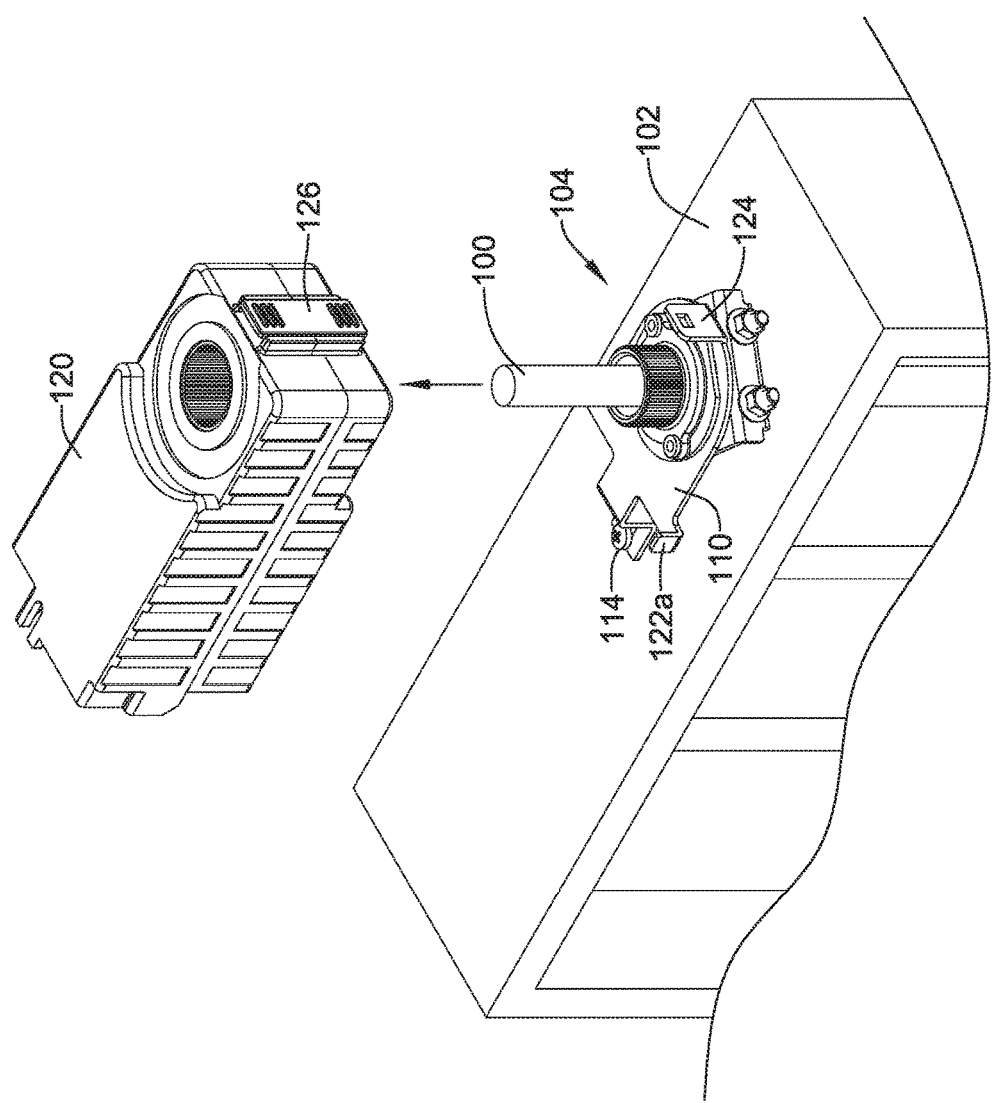

In some cases, the actuator 120 may be released by toggling the release actuator 126. FIG. 15 shows an installer toggling the release actuator 126. This releases the actuator from the non-self-centering actuator mounting assembly 104 for easy removal, as shown in FIG. 16.

Figure 17:
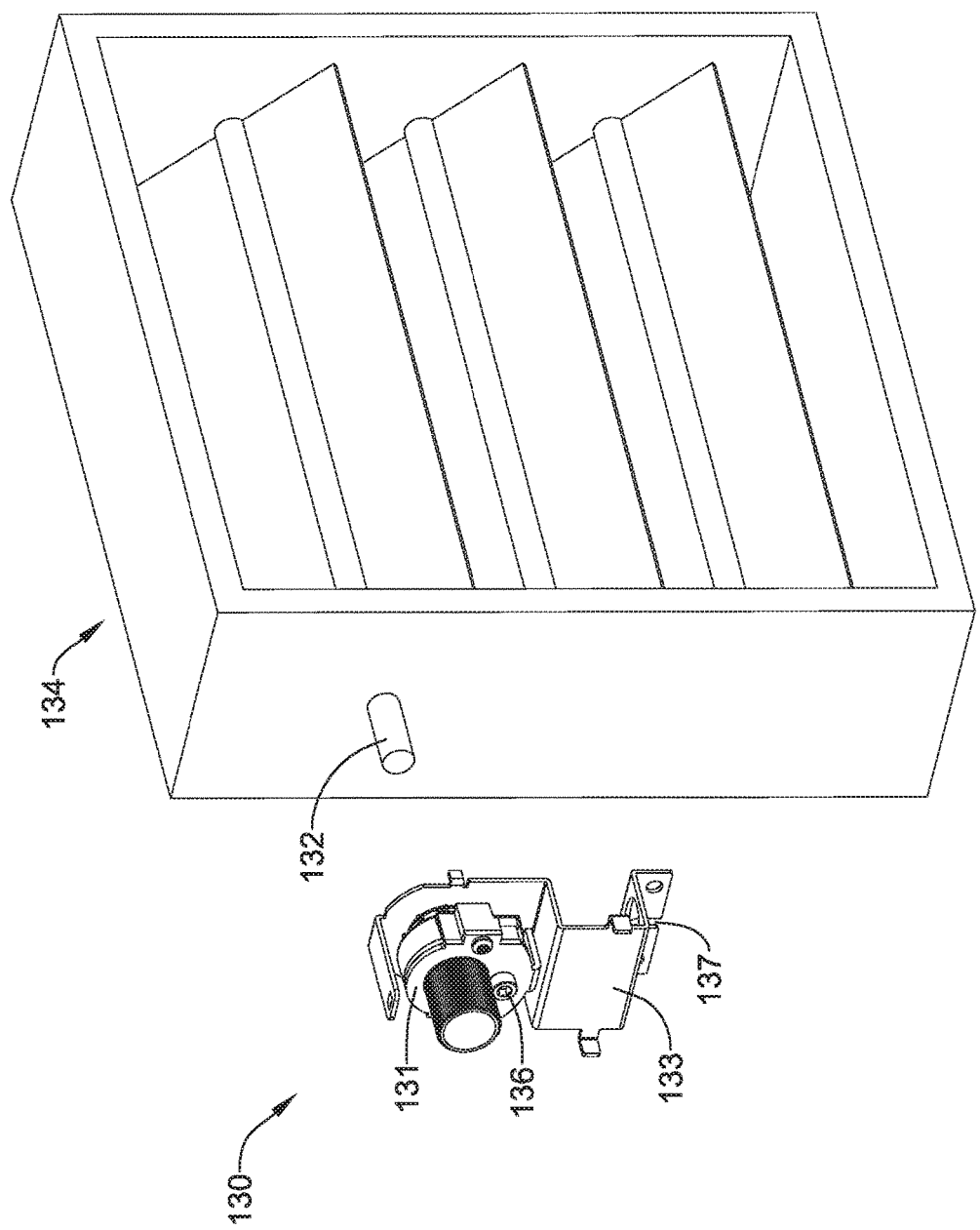
FIGS. 17-18 show an illustrative method for installing an illustrative self-centering valve actuator to an HVAC damper shaft.
Figure 18:
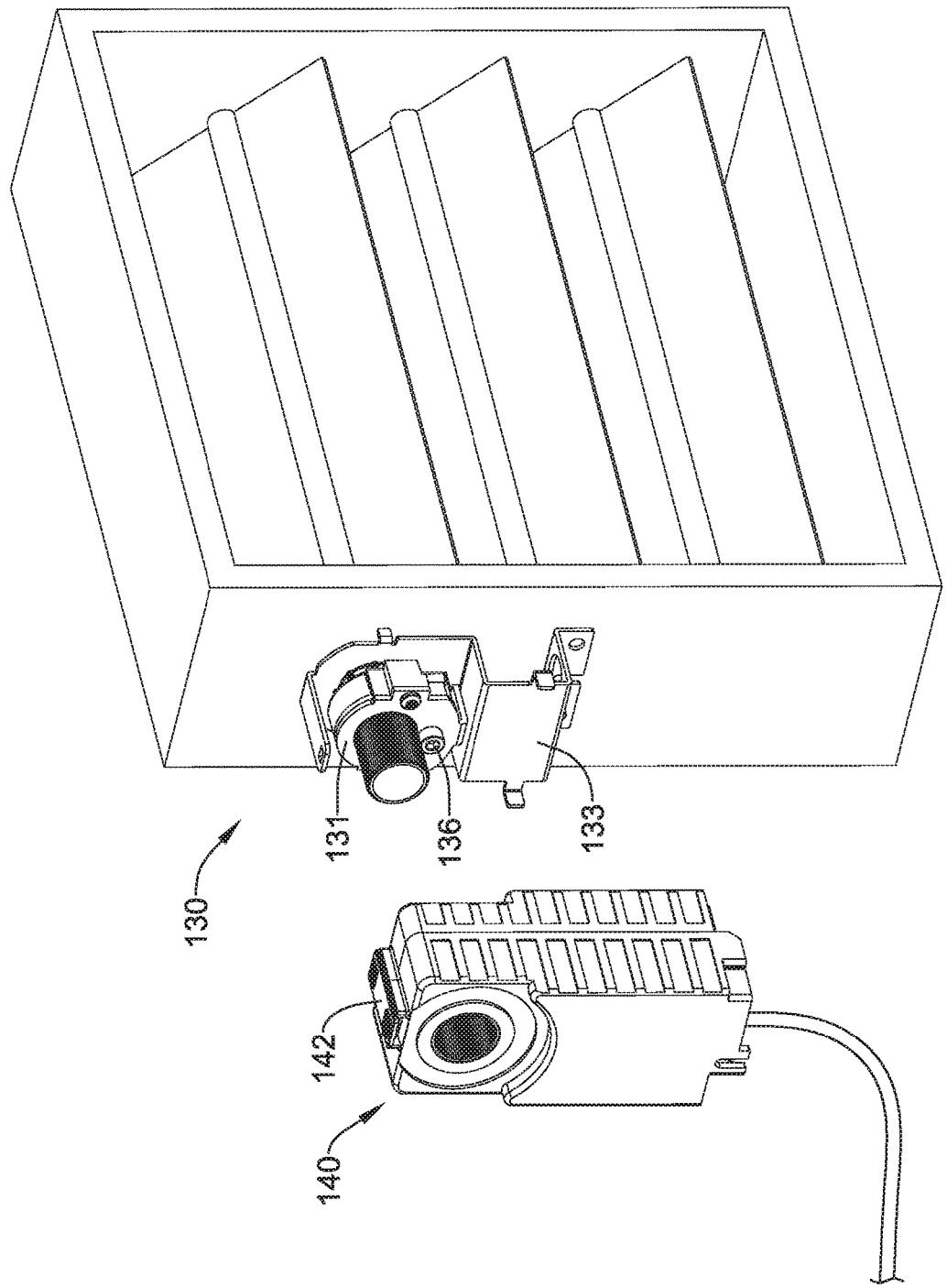

FIGS. 17-18 show an illustrative method for installing an illustrative self-centering valve actuator to an HVAC damper shaft. The illustrative self-centering valve actuator includes an illustrative self-centering actuator mounting assembly 130 and an actuator 140. The illustrative actuator mounting assembly 130 includes a self-centering shaft coupler assembly 131 rotatably mounted to an anti-rotation bracket 133. The self-centering shaft coupler assembly 131 may be the same or similar to that described in U.S. Pat. No. 8,287,207, which is incorporated herein by reference. During installation, the installer may turn screw 136 of the self-centering shaft coupler assembly 131 to secure the shaft coupler assembly 131 to the valve shaft 132. The installer may then rotate the anti-rotation bracket 133 to a desired position and insert a securement through slot 137 of the anti-rotation bracket 133 and into the HVAC damper body 134 to prevent the anti-rotation bracket 133 from rotating relative to the shaft 132 during operation. Once the actuator mounting assembly 130 is installed, and as shown in FIG. 18, an actuator 140 is snapped onto the actuator mounting assembly 130. To release the actuator 140, the installer simply toggles the release lever 142 of the actuator 140 and pulls the actuator 140 away.

In the example shown, the actuator 140 and actuator mounting assembly 130 are configured so that the actuator 140 may be mountable to the actuator mounting assembly 130 in two different orientations. In one orientation, the actuator 140 may rotate the valve shaft 132 via the actuator mounting assembly 130 in a clock-wise direction, and in the other orientation (actuator 140 flopped over), the actuator 140 may rotate the valve shaft 132 in a counter-clock-wise direction. When so provided, the drive direction of the valve shaft 132 can be changed by simply pushing release lever 142 to release the actuator 140 from the actuator mounting assembly 130, re-orientate the actuator 140, and then re-attached the actuator 140 to the actuator mounting assembly 130. This can typically be easily accomplished even in cramped spaces.

What is claimed is:

1. An actuator mounting assembly for mounting an actuator to drive a rotating shaft of an HVAC component, the actuator mounting assembly comprising:

a shaft coupler assembly configured to be releasably secured to the rotating shaft of the HVAC component so that, when releasably secured, the rotating shaft of the HVAC component rotates with the shaft coupler assembly;

a drive shaft operatively coupled to the shaft coupler assembly so that the shaft coupler assembly rotates with the drive shaft;

an anti-rotation bracket rotatably coupled relative to the shaft coupler assembly and the drive shaft so that the shaft coupler assembly and the drive shaft can rotate relative to the anti-rotation bracket, the anti-rotation bracket is configured to releasably secure the actuator to the anti-rotation bracket such that, when the actuator is releasably secured to the anti-rotation bracket, a drive member of the actuator engages and provides a rotation force to the drive shaft;

the anti-rotation bracket including one or more securement features that are used to prevent the anti-rotation bracket and thus the actuator from rotating with the rotating shaft of the HVAC component; and wherein the anti-rotation bracket is configured to releasably secure the actuator in at least two orientations including a first orientation with a first side of the actuator facing toward the shaft coupler assembly such that when the actuator is activated the drive member of the actuator engages and provides a rotation force to the drive shaft in a clockwise direction, and a second orientation with a second opposing side of the actuator facing toward the shaft coupler assembly such that when the actuator is activated, the drive member of the actuator engages and provides a rotation force to the drive shaft in a counter-clockwise direction.

2. The actuator mounting assembly of claim 1, wherein the actuator comprises an actuator release lever configured to releasably engage the anti-rotation bracket.

3. The actuator mounting assembly of claim 2, wherein the anti-rotation bracket comprises a front arm configured to extend into a slot on a side wall of the actuator.

4. The actuator mounting assembly of claim 3, wherein the front arm of the anti-rotation bracket further comprises a latching feature.

5. The actuator mounting assembly of claim 4, wherein the actuator release lever is configured to capture the latching feature of the front arm of the anti-rotation bracket when in a capture position.

6. The actuator mounting assembly of claim 5, wherein the actuator release lever is configured to release the latching feature of the front arm of the anti-rotation bracket when in a release position.

7. The actuator mounting assembly of claim 6, wherein the actuator release lever is configured to toggle about a pin between the capture position and the release position.

8. The actuator mounting assembly of claim 1, wherein the anti-rotation bracket is releasably secured between a lip of the drive shaft and an upper surface of a clip secured to the drive shaft.

9. The actuator mounting assembly of claim 1, wherein the anti-rotation bracket comprises a pair of side arms configured to receive the actuator and engage opposing side walls of the actuator.

10. A valve actuator assembly for actuating a shaft of a valve, comprising:
    an actuator having a first side, an opposing second side and a side wall extending between the first side and the second side, the actuator having a drive member with a first part that is accessible from the first side of the actuator and a second part that is accessible from the second side of the actuator;
    an actuator mounting assembly comprising:
        a drive shaft operably coupleable to the shaft of the valve, the drive shaft is configured to engage and provide a rotation force to the first part of the drive member of the actuator when the first side of the actuator is facing toward the drive shaft and is configured to engage and provide a rotation force to the second part of the drive member of the actuator when the second side of the actuator is facing toward the drive shaft;
        an anti-rotation bracket rotatably coupled relative to drive shaft so that the drive shaft can rotate with respect to the anti-rotation bracket, the anti-rotation bracket includes one or more securement features, that when used in conjunction with a securement prevents the anti-rotation bracket and thus the actuator from rotating with the shaft of the valve;
        the anti-rotation bracket is configured to releasably secure the actuator in at least two orientations including a first orientation with the first side of the actuator facing toward the drive shaft with the first part of the drive member engaging and capable of providing a rotation force to the drive shaft, and a second orientation with the second side of the actuator facing toward the drive shaft with the second part of the drive member engaging and capable of providing a rotation force to the drive shaft;
        wherein in the first orientation, the actuator drives the drive shaft in a clockwise direction when the actuator is activated and in the second orientation the actuator drives the drive shaft in a counter-clockwise direction when the actuator is activated.

11. The valve actuator assembly of claim 10, wherein the anti-rotation bracket is configured to releasably secure the actuator without the use of any tools.

12. The valve actuator assembly of claim 10, wherein the anti-rotation bracket is configured to releasably secure the actuator with the use of one or more tools.

13. The valve actuator assembly of claim 10, wherein the anti-rotation bracket is configured to releasably secure the actuator via a hand operated releasable latch.

14. The valve actuator assembly of claim 13, wherein hand operated releasable latch includes a pivoting actuator release lever that pivots between a capture position and a release position.

15. The valve actuator assembly of claim 10, wherein the anti-rotation bracket engages the side wall of the actuator to prevent the actuator from rotating relative to the anti-rotation bracket.

16. A method for installing an actuator to a rotatable shaft, the method comprising:
    mounting an actuator mounting assembly over a rotatable shaft, the actuator mounting assembly comprising a shaft adaptor for securing the actuator mounting assembly to the rotatable shaft, a drive shaft operably coupled to the shaft adaptor, and an anti-rotation bracket for releasably receiving an actuator and for preventing the actuator from rotating with the rotatable shaft;
    securing the anti-rotation bracket to a substrate that does not rotate with the rotatable shaft;
    releasably coupling the actuator to the actuator mounting assembly in one of a first orientation with a first side of the actuator facing toward the drive shaft and a second orientation with a second opposing side of the actuator facing toward the drive shaft; and
    wherein in the first orientation and when the actuator is activated, the actuator drives the drive shaft and thus the rotatable shaft in a clockwise direction, and wherein in the second orientation and when the actuator is activated, the actuator drives the drive shaft and thus the rotatable shaft in a counter-clockwise direction.

17. The method of claim 16 further comprising:
    removing the actuator from the actuator mounting assembly;
    flipping the actuator over and releasably coupling the actuator to the actuator mounting assembly such that the actuator can drive the drive shaft and thus the rotatable shaft in an opposing direction.

18. The method of claim 17, wherein the actuator is removable from the actuator mounting assembly through actuation of a hand operated latching mechanism.

19. The method of claim 17, wherein the actuator is removable from the actuator mounting assembly through actuation of an actuator release lever.

20. The method of claim 19, wherein the actuator release lever is configured to toggle between a capture position and a release position.

\* \* \* \* \*